United States Patent [19]

Eshghy et al.

[11] 4,106,570

[45] Aug. 15, 1978

[54] ANGLE SENSING TOOL FOR APPLYING TORQUE

[75] Inventors: Siavash Eshghy, Pittsburgh; George D. Hall, Oakmont; Dennis R. Hammerle, Pittsburgh, all of Pa.

[73] Assignee: Rockwell International Corporation, Pittsburgh, Pa.

[21] Appl. No.: 766,429

[22] Filed: Feb. 7, 1977

[51] Int. Cl.² .............................................. B23Q 5/027

[52] U.S. Cl. ...................................... 173/12; 81/52.4 R

[58] Field of Search .................... 173/12, 89, 139, 136, 173/133; 81/52.4

[56] References Cited

U.S. PATENT DOCUMENTS

| | | | |
|---|---|---|---|
| 3,939,920 | 2/1976 | Hardiman et al. | 173/12 |
| 3,974,685 | 8/1976 | Walker | 173/12 |
| 3,974,883 | 8/1976 | Sigmund | 173/12 |
| 3,982,419 | 9/1976 | Boys | 173/12 |
| 4,008,773 | 2/1977 | Wallace et al. | 173/12 |

*Primary Examiner*—Robert A. Hafer

[57] ABSTRACT

There is disclosed an air powered tool for applying torque to threaded fasteners and the like. The tool comprises a motor, a gear reducer and a driver whereby the motor turns at a higher rate than the driver. In order to provide better resolution of angle sensings, an angle sensor is arranged to determine rotation of the motor rather than of the driver. Because the fastener, driver, gear reducer and motor tend to torque up thereby producing an exaggerated reading for the angle of advance of the fastener, means are provided to compensate for the rotation sensing as a function of applied torque.

15 Claims, 3 Drawing Figures

ANGLE SENSING TOOL FOR APPLYING TORQUE

A typical arrangement for applying torque to threaded fasteners and the like comprises an air powered motor and a gear reducer in driving relation with a driver which is typically a socket or a screwdriver. In many techniques for controlling or sensing the degree to which a fastener is tightened, a sensing is made of the angle of advance of the fastener. One common technique in which angle sensings are required is called the turn-of-the-nut method which, in its simplest form, advances a fastener until a predetermined low torque value is reached and then the fastener is turned an additional constant predetermined angle. Another typical tightening strategy which requires angle sensings is disclosed in an article entitled "Electronic Torque Controls Set Fasteners' Tension," Assembly Engineering, September, 1974, pages 42–45.

Although typical prior art angle sensing torque applying tools locate the angle sensor between the gear reducer and the driver, there is shown in U.S. Pat. No. 3,982,419 a tool which senses angle off of the motor. There are two deficiencies in prior art angle sensing torque applying tools. The first is that there is no means for compensating for torsional twist of the output shaft. As will become evident, the amount of twist comprises the difference between the sensed amount of output shaft rotation and the amount of fastener rotation actually occuring. The amount of torsional twist is a function of applied torque and the torsional stiffness of the output shaft and the fastener.

When using a turn-of-the-nut tightening strategy, the amount the fastener is to be turned after the predetermined torque level is reached is normally empirically determined. If the empirical angle determination is made with a high torsional stiffness or short output shaft and production assembly is conducted with a low torsional stiffness or long output shaft, the actual fastener rotation in production will be consistently short of the empirical determination. Thus, with long output shafts as is common in multiple spindle tools, the amount of twist can significantly affect the clamping load or tension in the fastener.

The effect of applied torque is also significant but is more subtle. Assuming that the empirical determination of the amount the fastener is to be turned after the predetermined torque level is reached is made with average torque rate fasteners, the existance of high and low torque rate fasteners in production will have an effect on the difference between the amount of fastener rotation actually occuring and the amount of rotation sensed. For example, for a high torque rate bolt which is desired to be turned 100° after the predetermined torque value has been reached, the actual rotation of the fastener will be substantially below 100° because a significant amount of twist occurs in the output shaft. In a low torque rate bolt under similar circumstances, the amount of actual bolt rotation can exceed 100° because the empirically determined value includes a certain amount of twist greater than that experienced with the low torque rate bolt. It is accordingly apparent that the turn-of-the-nut method is not as independent of friction developed between the fastener parts as is commonly assumed.

The second problem with prior art angle sensing torque applying tools is that the resolution of the sensor leaves something to be desired. It is immediately evident that the accuracy of an angle sensor located between the gear reducer and driver is a function of the number of different shaft positions which can actually be perceived by the sensor. This is apparent from the following table.

TABLE 1

| Shaft locations actually perceivable | Sensor accuracy |
|---|---|
| 6 | 60° |
| 20 | 18° |
| 50 | 7.2° |
| 100 | 3.6° |
| 360 | 1° |

Because the shaft diameter being read is on the order of $\frac{1}{2}$–1 inch, it is evident that there is a limit, both practical and theoretical, to the number of shaft locations that the angle sensor can detect.

To overcome these deficiencies, the device of this invention provides means compensating for twist of the fastener and for twist of the drive train between the drive connection with the fastener and the location of the angle sensor. In addition, the resolution or accuracy of the angle sensor is substantially increased by locating the sensor to read off of the motor rather than off of the output shaft. Because the gear reducer between the motor and output shaft typically operates at a gear reduction of 20–40:1, a sensing unit capable of detecting only six different locations of the motor is actually capable of detecting between 120–240 output shaft positions which constitutes an angular accuracy of 3.0°–1.5°. Under similar circumstances with a sensor capable of detecting only twelve different motor locations, between 240–480 output shaft positions are detectable which corresponds to a sensor accuracy of 1.5°–0.75°. Accordingly, sensor resolution is substantially improved.

It is an object of this invention to provide an angle sensing tool for applying torque which compensates for twist of the fastener.

Another object of the invention is to provide an angle sensing tool for applying torque which compensates for torsional twist of the drive connection between the fastener and the location of the angle sensor.

Another object of the invention is to provide a torque applying tool comprising a driver, a motor and a reducer wherein angle sensings are conducted off of the motor and providing means for compensating the rotational sensings.

In summary, one aspect of the invention comprises a tool including means for applying torque to a workpiece, means for determining rotation of the torque applying means, means for sensing torque applied to the workpiece, and means for compensating the rotation determinations as a function of applied torque.

IN THE DRAWINGS

Figure 1:
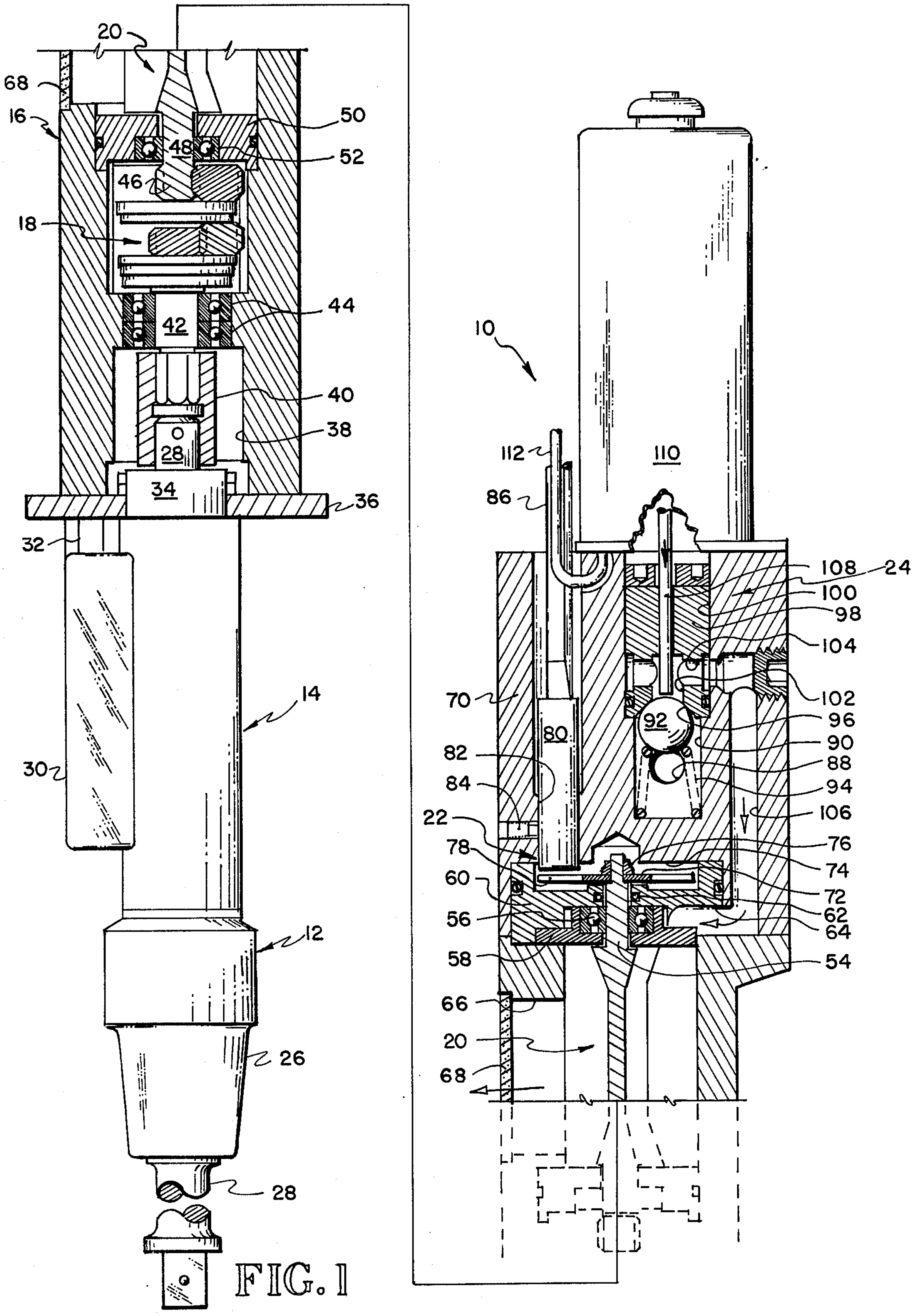
FIG. 1 is a side view, partially in section, of a torque applying tool in accordance with the principles of this invention.
Figure 2:
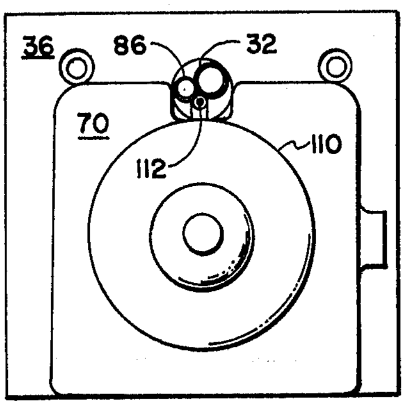
FIG. 2 is an end view of the tool of FIG. 1.

Referring to FIGS. 1 and 2, there is illustrated a torque applying tool 10 comprising, as major components, a fastener coupling 12, a torque transducer 14, a housing 16 receiving a gear reducer 18 and an air powered motor 20, an angle transducer 22 and an air control unit 24.

The fastener coupling 12 comprises a housing 26 rotatably receiving an output shaft or driver 28 having a fitting on the free end thereof for receiving a coupling such as a socket, screwdriver or other torque transmitting connection for releasable driving attachment to a fastener or workpiece.

The output shaft 28 extends through the torque transducer 14 which may be of any convenient type which operates to deliver reliable running torque readings. One suitable type transducer comprises a strain gauge mounted directly on the output shaft 28 with suitable transmitting equipment 30 mounted on the housing. One suitable transducer is available from Lebow Associates, Troy, Michigan and is known as a Rotary Transformer Torque Pickup Unit, Type 2. An electrical lead 32 extends from the torque transducer 14 to suitable readout equipment (not shown) or to the circuitry of FIG. 3 as more fully explained hereinafter.

The driven end of the output shaft 28 extends through a boss 34 and partition 36 into a recess 38 in the housing 16. A coupling 40 connects the output shaft 28 to a shaft 42 comprising an output of the gear reducer 18. The coupling 40 is conveniently splined on one end to receive complementary splines of the shaft 28 and provides a polygonal recess on the opposite end to receive a similarly shaped end of the shaft 42. The shaft 42 is mounted for rotation in the housing 16 by suitable bearings 44.

The gearing 18 may be of any suitable type and is illustrated as being of the planetary variety having an input 46. The gear reduction afforded by the reducer 18 is desirably at least 10:1 and preferably on the order of 20–50:1.

The motor 20 is illustrated as a vane motor having an output 48 drivably connected to the gear reducer input 46. The motor output 46 is positioned in a motor end plate 50 providing suitable bearings 52 for rotatably mounting the motor output 48. The opposite end of the motor 20 comprises a stub shaft 54 mounted for rotation by suitable bearings 56 in a motor end plate 58. A seal carrying block 60 extends over the end of the shaft 54 and is sealed relative thereto by a suitable O-ring 62. As will be more fully pointed out hereinafter, the sealing block 60 provides an air passage 64 leading to the motor 20 with air exhausting through an arcuate slot 66 in the housing 16. As is customary, the slot 66 is closed by an air permeable member 68.

Affixed to the end of the housing 16 by any suitable means, such as bolts or the like, is a housing 70 carrying the angle sensor 22 and the air control unit 24. Although the angle sensor 22 may be of any suitable type, it is illustrated as of the radiofrequency proximity type available through Banner Engineering Corporation, Minneapolis, Minnesota as Model NIGA-2. Angle sensors of this type include an encoding disc 72 located in a recess 74 provided between the housing 70 and the bearing block 60. The encoding disc 72 is mounted, as by the use of complementary splines or the like, to the end of the motor shaft 54 and is captivated thereto by a suitable connection 76. The encoding disc 72 is of metal having a plurality, for example, six, of equally spaced slots 78 on the circumference thereof cooperating with a radio frequency probe 80. The probe 80 basically detects the presence of the slots 78 and provides a pulsed output in response to the appearance of a slot 78 immediately adjacent the probe end. The probe 80 is mounted in a passage 82 in the housing 70 with a set screw 84 extending into the housing 70 perpendicular to the probe 80 for maintaining the probe 80 in position. A suitable electrical lead 86 extends out of the housing 70 toward suitable readout equipment as will be more fully apparent hereinafter.

In one model of the tool 10 that has actually been constructed and used, the gear reduction of the reducer 18 is approximately 37:1. In this device, the angle resolution is 1.6°. It will be apparent that in an optical angle sensor, the number of detectable locations on the disc 72 may be much greater, thereby substantially increasing resolution.

The air control unit 24 comprises an inlet 88 opening into a recess 90 housing a ball valve 92 biased by a spring 94 toward a valve seat 96 carried by a plug member 98 captivated in a recess 100 of the housing 70. The plug member 98 provides an axial passage 102 and an interesecting transverse passage 104 leading to an air passage 106 in the housing 70. The passage 106 ultimately communicates with the passage 64 to transmit power air to the vane motor 20 when the ball valve 92 is spaced from the valve seat 96 under the influnce of a rod 108 which is the output of a solenoid 110 affixed to the back of the housing 70 and energized through an electrical lead 112.

As will be apparent, energization of the solenoid 110 by electrical current passing through the lead 112 causes the solenoid output 108 to advance thereby unseating the ball valve 92 from the seat 96. High pressure air accordingly enters the inlet 88 and passes through the passages 102, 104, 106, 64 into the vane motor 20. The high pressure air rotates the vane motor 20 and exhausts through the air permeable member 68. Rotation of the vane motor 20 effects rotation of the gear reducer 18 thereby rotating the output shaft 28 thereby applying torque to a work piece or fastener.

As suggested previously, the amount of twist in the drive train and in the fastener that does not effect rotation of the fastener is a function of the applied torque and of the torsional stiffness of the drive train and fastener. The angular twist $\alpha_t$ to be disregarded can be expressed as:

$$\alpha_t = \Omega T \tag{1}$$

Where $\Omega$ is a constant for each tool which takes into account the torsional stiffness of the drive train and fastener and where $T$ is the applied torque. A value for $\Omega$ can usually be calculated using elementary mechanics or, in complicated situations, can be empirically determined. Thus, the actual amount of angular rotation of the fastener can be expressed as:

$$\alpha_{actual} = \alpha_m - \alpha_t \tag{2}$$

Where $\alpha_m$ is the angle measured by the sensor 22.

Figure 3:
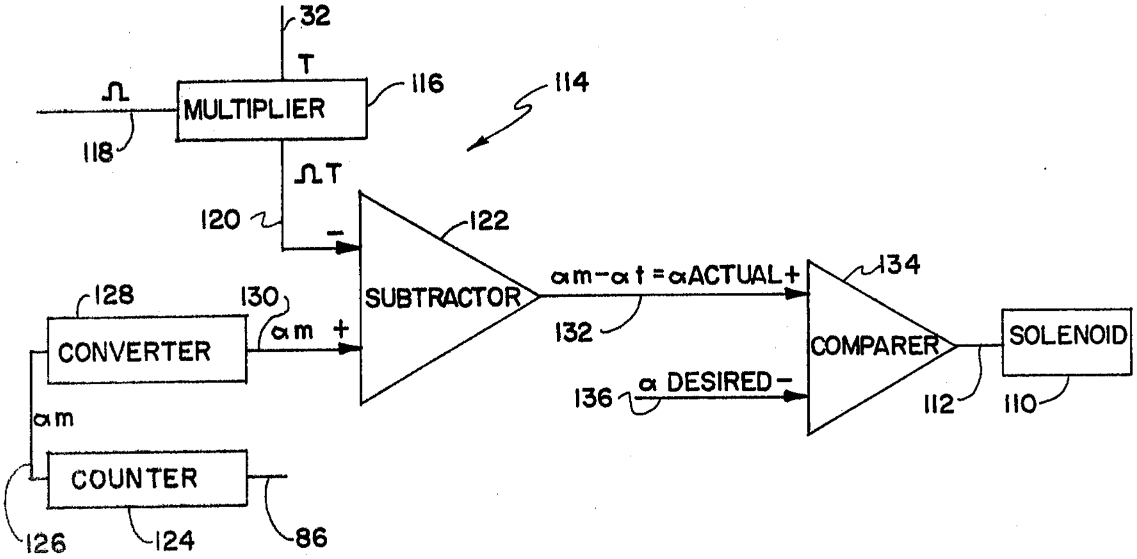
FIG. 3 is a schematic view of one embodiment of a compensating means for correcting angle sensings.

Referring to FIG. 3, one technique for compensating the rotational determination of the angle sensor 22 is illustrated. A compensating means 114 comprises a multiplier module 116, such as a four quadrant analog multiplier available from Analog Devices, Inc., Norwood, Massachusetts as a model 435. The multiplier module 116 is connected to the torque transducer lead 32. An input 118 to the multiplier 116 conveniently provides for the insertion of the value for $\Omega$. The output from the multiplier 116 comprises the product of $\Omega$ T which is, in accordance with the equation (1), $\alpha_t$. The value for $\alpha_t$ appears on an electrical lead 120 leading from the multiplier 116 to a subtracting module 122. The subtracting module 122 is conveniently an operational amplifier available from Analog Devices, Inc., Norwood, Massachusetts as a model 741.

The pulsed signals appearing in the electrical lead 86, which comprise the output of the angle sensor 22, are delivered to a counter 124 which totals the number of pulses. The counter 124 may, of course, be of any suitable type. A digital signal representative of the value of the pulses totaled by the counter 124 is placed on a lead 126 connected to a digital-to-analog converter 128 of any suitable type which converts the digital signal to a corresponding analog signal placed on a line 130 connected to the subtracting module 122. The subtracting module 122 effectively deducts the value of $\alpha_t$ from the total value of the pulses, or $\alpha_m$, appearing on the lead 130. The output of the subtracting module 122 appears on an electrical lead 132 and is representative of $\alpha_{actual}$. The lead 132 is connected to a comparing device 134 which has an input 136 carrying a signal representative of the desired angle of rotation for the fastener or $\alpha$ desired. The comparing device 134 may be, for example, an operational amplifier available from Analog Devices, Inc., Norwood, Massachusetts as Model 741. When the value of $\alpha_{actual}$ equals the value of $\alpha_{desired}$, the comparing device 134 deenergizes the solenoid 110 allowing the ball valve 92 to close against the seat 96 thereby stopping the rotational advance of the output shaft 28.

It will accordingly be apparent that the compensating means 114 effects a correction of the sensed angle of advance of the output shaft 28 into a corrected value representative of actual advance of the fastener. The circuitry of FIG. 3 is accordingly usable in turn-of-the-nut tightening strategies as well as a torque-turn tightening strategy as pointed out in the Assembly Engineering article mentioned previously.

The compensating technique of this invention is also useful in conjunction with the tightening strategy disclosed in Design Engineering (London), January 1975, pages 21-23, 25, 27, 29. This strategy is basically the detection of yield point and stopping fastener rotation in response thereto. The yield point is detected by comparing torque rate values taken over rather small angle increments. When the ratio of the last calculated torque rate to an earlier calculated torque rate reaches a certain value, the conclusion is that the yield point has been reached and accordingly fastener rotation is stopped. A two-point measured torque rate between two points is:

$$TR_m = \frac{T_2 - T_1}{\alpha_2 - \alpha_1} \quad (3)$$

where $T_2$ is the sensed torque value at the second point, $T_1$ is the sensed torque value at the first point, $\alpha_2$ is the angle of threading advance at the second point and $\alpha_1$ is the angle of threading advance at the first point. Since the sensed values of $\alpha_2$ and $\alpha_1$ are affected by torsional twist of the output shaft and fastener, it is evident that the calculated value of $TR_m$ is affected by twist. It can be shown that a very good approximation for the corrected torque rate $TR_{correct}$ is:

$$TR_{correct} = TR_m [1 + \Omega (TR_m)] \quad (4)$$

Thus, in a technique in accordance with the Design Engineering tightening strategy, the ratio to be compared should not be the ratio of measured torque rates but the ratio of actual or corrected torque rates which will eliminate the effect of twist in the tool drive train and in the fastener.

Another tightening strategy for which this invention is adapted utilizes the fastener tension rate, i.e. the increase in tension resulting in the fastener per unit of threading angle advance. In this technique, the empirically determined value for tension rate $FR_m$ will differ from a corrected tension rate $FR_{cor}$ as a function of applied torque. It can be shown that a very good approximation for the corrected tension rate $FR_{cor}$ is:

$$FR_{cor} = FR_m [1 + \Omega (TR)] \quad (5)$$

where $TR$ is desirably, but not essentially, a corrected torque rate value over essentially the same angle span as the tension rate applies to. When utilizing the corrected value of tension rate $FR_{cor}$ in calculations to estimate actual tension appearing in production fasteners, the calculations can be compensated by using an apparent tension rate $FR_{app}$. A very close approximation for apparent tension rate $FR_{app}$ is:

$$FR_{app} = FR_{corrected} [1 - \Omega (TR)]. \quad (6)$$

It will accordingly be apparent that the technique of this invention is capable of use in many different tightening strategies requiring the accurate determination of the angle of threading advance of the fastener. Although the illustrated circuitry of FIG. 3 basically constitutes an analog approach, it will be evident to those skilled in the art that the same technique can be accomplished by digital computations. Similarly, the technique of this invention can be used for monitoring tightening, as opposed to controlling tightening, merely by reading out values of $\alpha_{actual}$ from the line 132.

We claim:

1. A tool comprising
- means for applying torque to a workpiece;
- means for determining rotation of the torque applying means;
- means for sensing torque applied to the workpiece; and
- means for compensating for torsional twist in the torque applying means including means correcting the rotational determinations as a function of applied torque and the torsional stiffness of the torque applying means.

2. The device of claim 1 wherein the correcting means comprises means reducing the rotation determinations by a value related to the product of applied torque and the torsional stiffness of the torque applying means.

3. The tool of claim 1 wherein the compensating means comprises means for compensating the rotation determinations as a function of torsional stiffness of the torque applying means between the workpiece and the sensing means.

4. The tool of claim 1 wherein the torque applying means comprises a driver for releasable connection to the workpiece, a rotary motor and a reducer drivably connecting the motor and the driver for rotating the driver slower than the motor speed and at a predetermined fractional ratio thereof; and wherein the determining means comprises means for sensing angular rotation of the motor.

5. The tool of claim 1 wherein the torque applying means comprises a driver for releasable connection to the workpiece, a motor having a rotatable shaft, and a reducer drivably connecting the motor shaft and the driver for rotating the driver slower than the motor shaft and at a predetermined fractional ratio thereof; and wherein the determining means comprises means for sensing angular rotation of the motor shaft.

6. A device for tightening threaded fasteners, comprising:

means for applying torque to the fasteners for threadably advancing the same;

means for determining rotation of the torque applying means;

means for sensing the torque applied to the fasteners; and means operable during tightening of the fasteners for compensating for torsional twist in the torque applying means including means for correcting the rotation determinations in response to applied torque and rotational stiffness of the torque applying means.

7. The device of claim 6 wherein the correcting means comprises means reducing the rotation determinations by a value related to the product of applied torque and the rotational stiffness of the torque applying means.

8. The device of claim 7 wherein the device comprises means for stopping threading advance of the fasteners in response to the corrected rotation determination.

9. The device of claim 7 wherein the device comprises means for stopping threading advance of the fasteners in response to a function of the corrected rotation determination.

10. A torque applying tool comprising a coupling having an output shaft for releasable connection to a workpiece;

a gear reducer having an output coupled to the output shaft, an input and gearing operatively connecting the input and output for driving the output at a lower rate than the input;

a rotary motor having an output, adjacent a first motor end, operatively connected to the gear reducer input and a second motor end opposite from the first motor end;

an angle sensor disposed adjacent the second motor end for sensing angular rotation thereof; and means for compensating rotational twist in the coupling, gear reducer and motor including means correcting the rotation sensings as a function of applied torque and the torsional stiffness of the coupling, gear reducer and motor.

11. The torque applying tool of claim 10 wherein the motor comprises a shaft adjacent the second motor end and wherein the angle sensor comprises means for sensing angular rotation of the shaft.

12. The torque applying tool of claim 10 wherein the gear reducer gearing provides a ratio of at least 10:1 between the reducer input and output rotational rates.

13. The device of claim 10 wherein the correcting means comprises means reducing the rotation sensings by a value related to the product of applied torque and the torsional stiffness of the coupling, gear reducer and motor.

14. A device for tightening threaded fasteners, comprising means for applying torque to the fasteners for threadably advancing the same;

means for determining rotation of the torque applying means;

means for sensing the torque applied to the fasteners;

means for terminating tightening of the fasteners in response to a function of the angle of rotation; and means compensating for torsional twist in the torque applying means during threadable advance of the fasteners.

15. The device of claim 14 wherein the compensating means includes means for correcting the function of the angle of rotation in response to the torsional stiffness of the torque applying means.

* * * * *

UNITED STATES PATENT AND TRADEMARK OFFICE

CERTIFICATE OF CORRECTION

PATENT NO. : 4,106,570

DATED : August 15, 1978

INVENTOR(S) : Siavash Eshghy, George D. Hall and Dennis R. Hammerle

It is certified that error appears in the above-identified patent and that said Letters Patent are hereby corrected as shown below:

Column 5, lines 22 and 23, delete "α desired" and insert --$^{\alpha}$desired--.

Column 7, line 28, delete "7" and insert --6--.

Column 7, line 32, delete "7" and insert --6--.

Signed and Sealed this

***Twenty-second* Day of *May 1979***

[SEAL]

*Attest:*

RUTH C. MASON
*Attesting Officer*

DONALD W. BANNER
*Commissioner of Patents and Trademarks*